Sept. 11, 1956        T. G. HARE        2,762,484

CENTRIFUGAL FRICTION TYPE CLUTCH WITH CHAIN MEMBER

Filed June 2, 1952        2 Sheets—Sheet 1

Inventor:
Terence G. Hare.
BY Searman & Searman
ATTORNEY

Sept. 11, 1956 T. G. HARE 2,762,484
CENTRIFUGAL FRICTION TYPE CLUTCH WITH CHAIN MEMBER
Filed June 2, 1952 2 Sheets-Sheet 2
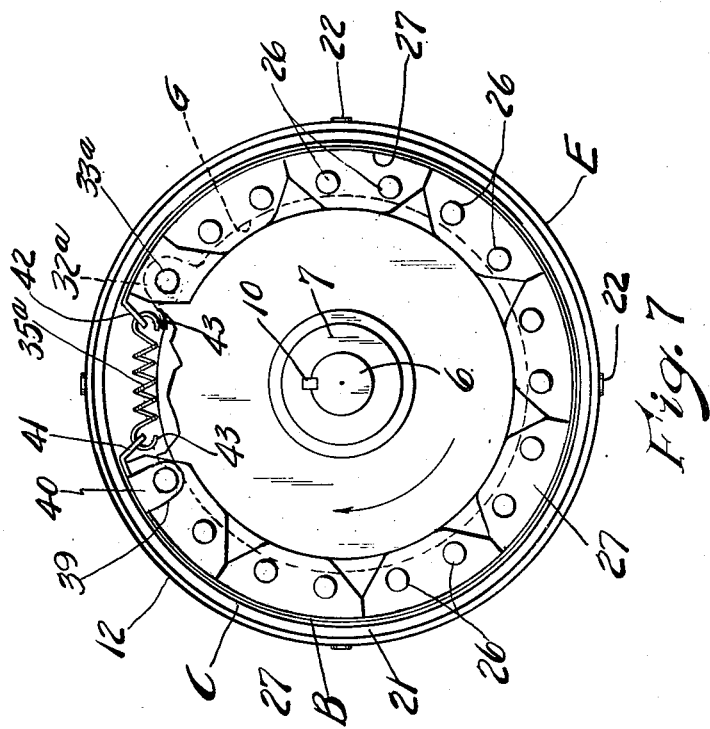
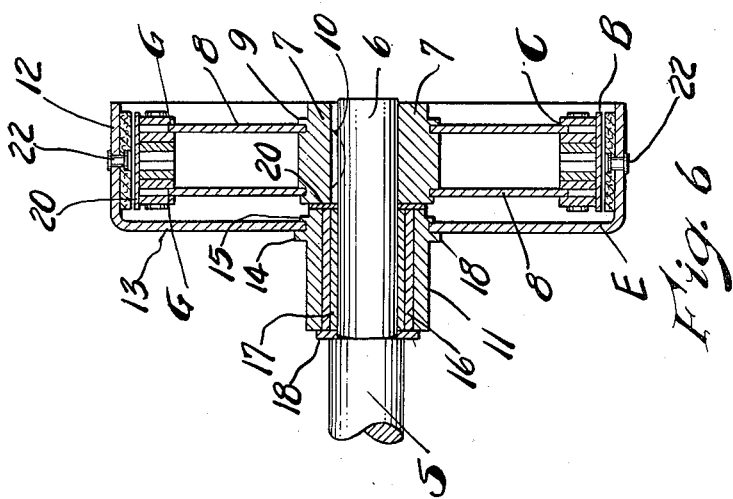
INVENTOR.
Terence G. Hare.
BY
Learman & Learman.
ATTORNEY

United States Patent Office 2,762,484
Patented Sept. 11, 1956

2,762,484

CENTRIFUGAL FRICTION TYPE CLUTCH WITH CHAIN MEMBER

Terence G. Hare, Detroit, Mich.

Application June 2, 1952, Serial No. 291,095

12 Claims. (Cl. 192—105)

The present invention relates to centrifugal friction type clutches for drivingly connecting two cooperating members when one of the members attains a predetermined angular velocity, and more particularly to improvements in correlative automatic clutch constructions of the type referred to in my previously filed application entitled "Centrifugal Friction Type Clutch," Serial No. 258,209, filed November 25, 1951.

One of the prime objects of the invention is to provide a clutch of the type described in which an articulable friction element is urged into frictional engagement with the clutch drum when the inner clutch member is driven above a predetermined speed.

A further object of the instant invention is to provide a centrifugal friction type clutch in which the articulable rotating element is moved into direct frictional engagement with a friction band provided on the inner face of the clutch drum.

A still further object of my invention is to provide a clutch of the centrifugal friction type having an articulable chain actuator made up of specially designed link units, the outer face of which is smoothly ground to conform to the inner peripheral face of the friction band to allow the chain to smoothly engage the friction band with a minimum of wear.

A still further object is to provide a chain actuator which can be brought into direct frictional engagement with the clutch drum lining so that where heat is generated, due to friction and slippage, the binder used in the curing of the lining will flow away from the operating surface rather than toward it as occurs when the lining band is mounted on the chain actuator instead of the drum.

Another object of my invention is to provide chain link units comprised of a plurality of interdigitatingly disposed links arranged in side-by-side relation, the central links over the chain length being narrower than the other links so that a continuous groove is formed in the inner face of the chain over its entire length, which groove serves to accommodate the peripheral outer edge of inner clutch member to balance and guide the chain as it moves into and out of frictional engagement with the outer clutch member.

Another object is to provide an automatic friction clutch of the above-mentioned type in which one end of the link chain is connected to the driving clutch element, while the opposite leading end is yieldingly connected to said element by yieldable means which can be changed to vary the R. P. M. at which the clutch is engaged and disengaged.

A further object is to provide a clutch of the type described which can be easily and cheaply manufactured, and which is readily adjustable to suit various types of power transmission.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 6 is an enlarged, fragmentary, cross section of the link chain actuator and the inner clutch element showing a slightly modified construction.

Fig. 7 is a fragmentary, cross sectional view taken on the line 7—7 of Fig. 6 showing a band interposed between the link chain actuator and the outer clutch element.

Figure 1:
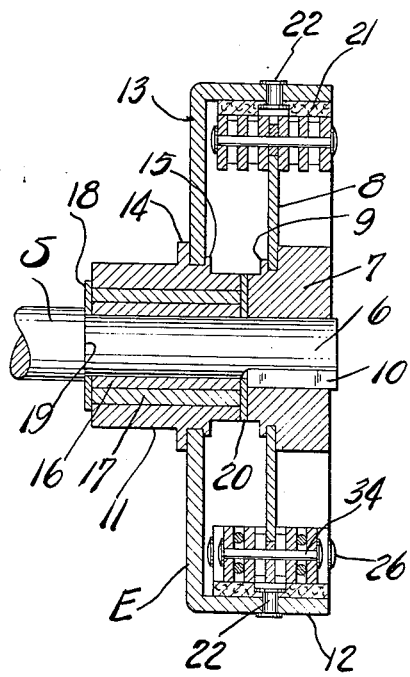
Fig. 1 is a diametric, cross-sectional view taken on the line 1—1 of Fig. 2, illustrating the manner in which the link chain actuator is housed within the outer clutch member.

Referring now more particularly to the accompanying drawings, I have shown a drive shaft S, one end of which is connected to a prime mover (not shown), such as an internal combustion engine or electric motor, but it is to be understood, of course, that the clutch assembly can be used for drivingly connecting and coupling shafts of other devices where it is desired to transfer rotary motion from one unit to another.

The one end 6 of the shaft S is reduced in diameter and has mounted thereon the hub 7 of an inner clutch member or disk 8 which is secured to said hub by upsetting the metal as at 9, and a key 10 serves to anchor the hub on the shaft. Rotatably mounted on the reduced portion 6 of the shaft S is the hub 11 of the outer clutch element E which overlies the inner clutch disk 8, said element including a drum 12 having a radial wall portion 13, which wall is provided with a central opening for receiving the hub 11, and said hub is provided with radial flanges 14 and 15 which abut against the sides of the radial wall portion 13 to rigidly secure the outer clutch element to the hub. Bearing sleeves 16 and 17 are interposed between the hub 11 and reduced portion 6 of the shaft, said sleeves being formed of steel or any other suitable bearing metal.

A thrust washer 18 engages the shouldered portion 19 of the shaft S, and prevents axial movement of the hub 11 in one direction, and a similar thrust washer 20 is interposed between the hub 7 of the inner clutch member and the hub 11 of the outer clutch member to prevent axial movement of the hub 11 in the opposite direction.

The hub 11 of the outer clutch member is connected to a suitable member (not shown) for power transmission by means of gearing or belting in the conventional manner. A flexible friction band or lining 21, formed of asbestos composition or the like, is riveted or secured to the inner face of the drum 12 as at 22, and the outer periphery of the inner clutch disc is spaced from the band 21 a distance sufficient to accommodate the articulable link chain C, said chain comprising a series of alternately positioned special chain link units X and Y. The unit X is made up of a plurality of individual links 24 (shown in Fig. 4 of the drawings), and a center link 25 (see Fig. 5), the unit X including one or more links than does the unit Y. The unit Y is made up of a plurality of links 24 and the links of each unit are arranged in interdigitating relation with the ends of the links of the next unit, the links of the unit X fitting between the ends of the links of the unit Y, and being connected by means of pins 26 extending through suitable openings provided in the links which make up the chain.

Figures 4, 5:
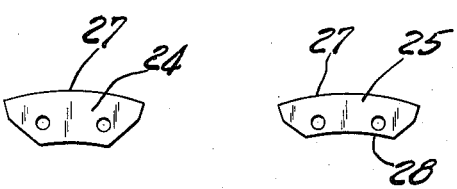
Fig. 4 is a side elevational view of one of the links.
Fig. 5 is a similar view of one of the groove-forming links.

Shown in Figs. 4 and 5 are my specially designed chain links 24 and 25, and these links have their outer arcuate surfaces 27—27 ground to conform to the diameter of the inner peripheral face of the lining 21 so as to provide over-all facial contact therewith over the entire length of the chain C when said chain is urged into engagement therewith by centrifugal force. It is important to note that the width or distance between the inner and outer arcuate edges of link 25 (shown in Fig. 5), is somewhat less than the width of the link 24 (shown in Fig. 4), and these links 25 are positioned end-to-end, centrally in the chain units X and form the middle or central links over the length of the chain, thus providing a groove G in the inner face of the chain, said groove accommodating the peripheral edge of the inner clutch member, balancing and guiding the chain as it moves into and out of engagement with the friction band.

The inner edge or surface 28 of the links 25 is ground to conform to the outer diameter of the groove G, and I wish to direct particular attention to the fact that the link units or sets X are formed entirely of links 24, while the link sets Y are composed of a plurality of identically similar links 24 with a central link 25 positioned as shown, the links of each set Y having their ends interfitting between the ends of the links in the next set of links X, and are secured thereby by the pins 26.

Conventional roller links 30 having enlarged end portions 31 similar to the links of a roller chain form an anchoring link unit at one end of the chain actuator, and these links are positioned interdigitatingly with respect to the adjacent specially designed chain set or unit Y, and are secured thereto at one end by a pin 26 as before.

The links 30 of the anchoring link unit are secured to an ear 32 provided on the outer periphery of the inner clutch disc 8 by means of pin 33; thus, with the inner clutch disc 8 rotating counter-clockwise in the direction indicated by the arrow (Fig. 2), the chain actuator C extends peripherally over substantially the entire circumference of the inner clutch member 8 in the direction of rotation, with its opposite end floatingly mounted and free to move circumferentially.

The units X and Y of the interdigitating chain links are so arranged that the free end of the chain actuator terminates in a link unit Y, and a pin 34 is inserted through suitable openings provided in said links, springs 35 yieldably securing the free end of the chain to the disc, the ends 36 of said springs being releasably secured to the pin 34 in the usual manner.

Figure 2:
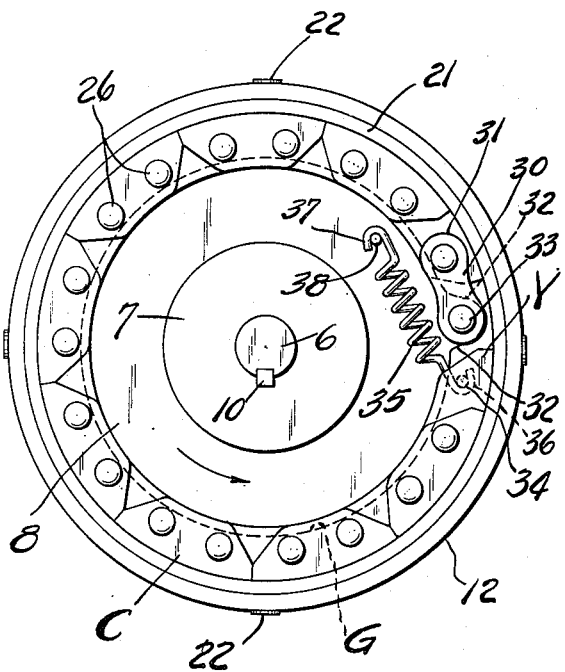
Fig. 2 is a side elevational view of the clutch assembly, the arrow indicating the direction of rotation of the in-inner clutch member when the clutch is operated.
Figure 3:
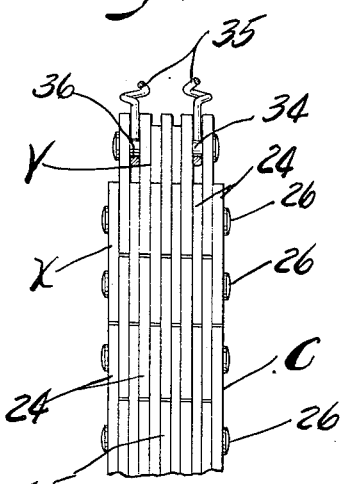
Fig. 3 is an enlarged, fragmentary, end elevational view of the floating end of the chain actuator.

The opposite ends of the coil springs 35 are formed with hooked ends 37 which are attached to projecting lugs 38 provided on either side of the inner clutch disk 8 as shown in Fig. 2, and it will thus be obvious that the actuator chain C is firmly anchored to the ear 32 by the pin 33, and yieldably and floatingly connected to the inner clutch member 8 at the pin 34.

In describing the operation of the clutch, it will be assumed that the shaft S is driven in a counter-clockwise direction from a position of rest, so that when the inner clutch 8 and actuator C reach a predetermined R. P. M., the centrifugal force thus created will exert a radial force throughout substantially the entire length of the circumferentially positioned chain and thereby urge the smoothly ground outer face of said chain actuator C into frictional engagement with the lining 21. This self-energized, crowding or progressive wedging action of the flexible chain actuator C will cause the circumferential position of the chain to expand, urging the chain actuator C, at a predetermined speed, into tight, frictional engagement with the inner peripheral face of the lining 21 and thereby cause rotation of the drum 12 with the shaft S. Suitable driving mechanism may then be employed on the hub 11 to transmit the power therefrom to whatever mechanism it is desired to drive. The clutch will be similarly disengaged as the speed of the inner clutch disc and chain, and the centrifugal force created thereby are reduced. The speed at which the engagement and disengagement takes place may, of course, be varied by increasing or decreasing the tension of the coil springs 35.

In Figs. 6 and 7 of the drawings I have shown a modified construction in which the inner clutch element 7 is formed with two spaced disk elements 8—8, and the chain actuator C is formed with two grooves G—G, these grooves being properly spaced to conform to the spacing of the disks 8—8, and provides uniform balancing of the chain actuator on the clutch element.

A flexible metallic band B encircles the chain actuator C and one end thereof is provided with a pair of ears 39 for receiving the pin 40 on the one set of end chain links. Inwardly bent tabs 41 and 42 are provided on the ends of the metallic band B and these are provided with apertures (not shown) for receiving the hooked ends 43 of a coil spring 35ª as usual. This spacing of the disk 8—8 makes it possible to locate the return spring 35ª therebetween and any reasonable number of disks can be provided as desired.

It is to be understood that the forms of the invention herewith shown and described are to be taken as preferred embodiments and that various changes in the shape, size, and arrangement of parts may be resorted to without departing from the spirit of the invention or the scope of the subjoined claims.

What I claim is:

1. In a centrifugal clutch, inner and outer clutch elements mounted for relative rotation, a friction band interposed between said inner and outer clutch elements a flexible friction member having one end connected to said inner clutch element and arranged between said inner and outer clutch elements to be moved into driving engagement with said outer clutch element when said shaft attains a predetermined rotational speed, said flexible friction member being formed of a series of pivotally connected chain links with their outer edge surfaces shaped to conform to the contour of the outer clutch elements.

2. In a centrifugal clutch, a rotary shaft, inner and outer clutch elements mounted on said shaft for relative rotation, an articulated actuator member having one end connected to said inner clutch element and arranged between said inner and outer clutch elements to be moved into frictional engagement with said outer clutch element when said shaft attains a predetermined rotational speed, said actuator member being formed of a series of pivotally connected chain links, the outer edge surfaces of which are shaped to conform to the circular contour of the outer clutch elements with certain of said links of a size to form a continuous guide groove for guidingly receiving the outer edge of the inner clutch element.

3. In a centrifugal clutch, inner and outer clutch elements mounted for relative rotation, a flexible friction member having one end connected to said inner clutch element and arranged between said inner and outer clutch elements to be moved into frictional engagement with said outer clutch element when said shaft attains a predetermined rotational speed, said flexible friction element being formed of a series of arcuately-shaped pivotally connected chain links, with certain of said links being of reduced size to provide a guide slot for slidably receiving the inner clutch element.

4. In a centrifugal clutch, an inner clutch element and an outer clutch drum mounted for relative rotation, and a flexible articulated actuator member interposed between said inner clutch element and said clutch drum and extending thereabout with one end affixed to the inner clutch element and its other end yieldingly connected to said inner clutch element, whereby rotation of said element at a predetermined speed of rotation will urge said actuator member into frictional driving engagement with said clutch drum, said flexible clutch element being formed of a series of pivotally connected chain links with their outer edge surfaces curved to conform to the curvature of the inner peripheral wall of said clutch drum.

5. In a centrifugal clutch, an inner clutch element and an outer clutch drum mounted for relative rotation, said outer clutch drum being arranged to encompass said inner clutch element, and a flexible clutch member interposed between said inner clutch element and said clutch drum and extending thereabout with one end affixed to the inner clutch element and its other end yieldingly connected to said clutch element, whereby rotation of said element at a predetermined speed of rotation will urge said flexible clutch element into frictional driving engagement with said clutch drum, said flexible clutch element being composed of a series of pivotally connected chain links, having their upper edge surfaces arcuately shaped to conform to the inner peripheral surface of said clutch drum, certain of said links being of a size to form a continuous annular guide groove between adjacent links for guidingly receiving the peripheral edge of said inner clutch member.

6. In a centrifugal clutch, a drive shaft, an inner clutch element and an outer clutch drum mounted for relative rotation, said outer clutch drum being arranged to encompass said inner clutch element, and a flexible clutch member interposed between said inner clutch element and said clutch drum and extending thereabout with one end affixed to the inner clutch element and its other end yieldingly connected to said clutch element, whereby rotation of said element at a predetermined speed of rotation will urge said flexible clutch element into frictional driving engagement with said clutch drum, said flexible clutch element being formed of a series of interdigitating pivotally connected chain links with certain of said links of slightly smaller size to provide an annular guide groove for receiving the peripheral edge of said inner clutch element.

7. In a centrifugal clutch, a drive shaft, a disk keyed to said shaft, a clutch drum rotatably mounted on said shaft having a flange spaced radially from the peripheral edge of said disk, a friction lining on the inner surface of said flange, and a flexible clutch element encircling said disk with one end pivotally connected thereto and the opposite end yieldingly connected thereto, whereby said flexible clutch element will expand into engagement with said friction lining when the drive shaft is rotated at a predetermined speed, said flexible clutch element being formed of a series of pivotally connected chain links having curved outer edge portions to conform to the contour of said flange and lining.

8. In a centrifugal clutch, a drive shaft, a disk keyed to said shaft, a clutch drum rotatably mounted on said shaft having a flange spaced radially from the peripheral edge of said disk, a friction lining on the inner surface of said flange, and a flexible clutch element encircling said disk with one end pivotally connected thereto and the opposite end yieldingly connected to said disk, whereby said flexible clutch element will expand into engagement with said friction lining when the drive shaft is rotated at a predetermined speed, said flexible clutch element being formed of a series of pivotally connected chain links with the intermediate links slightly smaller than the remaining links to provide a continuous guide groove for receiving the peripheral edge of said disk.

9. In a centrifugal clutch, inner and outer clutch elements mounted for relative rotation, a flexible actuator member having one end connected to said inner clutch element, a flexible metallic band surrounding said actuator member, said member and band being arranged between the inner and outer clutch elements to be moved into frictional engagement with said outer clutch element when said shaft attains a predetermined rotational speed, said flexible actuator member being formed of a series of pivotally connected chain links, the outer edge surfaces of which are shaped to conform to the circular contour of the outer clutch element, with certain of said links of a size to form a continuous guide groove for guidingly receiving the outer edge of the inner clutch element.

10. In a centrifugal clutch, a rotary shaft, inner and outer clutch elements mounted for relative rotation, a friction lining secured to the outer clutch element, a flexible friction actuator member having one end connected to said inner clutch element and arranged between said inner and outer clutch element, a flexible metallic band mounted on said actuator to be moved into frictional engagement with said friction lining when said shaft attains a predetermined rotational speed, said actuating member being formed of a series of arcuately-shaped, pivotally connected chain links with certain of said links being of reduced size to provide a guide slot for slidably receiving the inner clutch element.

11. In a centrifugal clutch, a rotary shaft, inner and outer clutch elements mounted for relative rotation, a flexible actuator having one end anchored to the inner clutch element, a flexible metallic band surrounding said actuator and connected to the free end thereof, said actuator and band being arranged between the inner and outer clutch elements and movable outwardly into frictional engagement with the outer clutch element when said shaft attains a predetermined rotational speed, said actuator member being formed of a series of arcuately shaped pivotally connected chain links with certain of said links being of reduced size to provide a guideway for slidably accommodating the inner clutch element, and resilient means connecting the ends of said band.

12. In an automatic speed responsive clutch, an inner clutch member and an outer clutch member mounted for relative rotation, and link chain means, including pivotally connected links capable of buckling, circumferentially disposed relative to said inner clutch member and connected at one end thereto, said link chain means being movable outwardly under the effect of centrifugal force into driving engagement with said outer clutch member when the inner clutch member reaches a predetermined speed of rotation.

References Cited in the file of this patent
UNITED STATES PATENTS

| | | |
|---|---|---|
| 1,853,908 | Lake | Apr. 12, 1932 |
| 1,887,467 | Renshaw | Nov. 8, 1932 |
| 1,898,888 | Newcomb | Feb. 21, 1933 |
| 1,983,661 | Frantz et al. | Dec. 11, 1934 |
| 2,035,242 | McCann | Mar. 24, 1936 |
| 2,087,488 | Stanley | July 20, 1937 |
| 2,230,293 | Harris | Feb. 4, 1941 |
| 2,513,798 | Hatfield | July 4, 1950 |
| 2,596,193 | Zieg | May 13, 1952 |

FOREIGN PATENTS

| | | |
|---|---|---|
| 439,424 | France | June 13, 1912 |